United States Patent
Chung et al.

(10) Patent No.: US 9,639,075 B2
(45) Date of Patent: May 2, 2017

(54) STATUS CONTROLLER, COMPUTER SYSTEM, AND STATUS DETECTING METHOD THEREOF

(71) Applicant: Wistron Corporation, New Taipei (TW)

(72) Inventors: Chao-Hsiang Chung, New Taipei (TW); Yuan-Chan Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 508 days.

(21) Appl. No.: 14/156,318

(22) Filed: Jan. 15, 2014

(65) Prior Publication Data

US 2014/0350698 A1  Nov. 27, 2014

(30) Foreign Application Priority Data

May 21, 2013 (TW) .............................. 102117926 A

(51) Int. Cl.
*G06F 1/32* (2006.01)
*G06F 1/26* (2006.01)
*G05B 15/02* (2006.01)

(52) U.S. Cl.
CPC ........... *G05B 15/02* (2013.01); *G06F 1/3206* (2013.01); *G06F 1/324* (2013.01); *Y02B 60/1217* (2013.01)

(58) Field of Classification Search
CPC .... G06F 1/3203; G06F 1/3206; G06F 1/3287; G06F 1/3296; G06K 7/10722;
(Continued)

(56) References Cited

U.S. PATENT DOCUMENTS 7,437,575 B2 * 10/2008 Dennis ................. G06F 1/3203
713/300
7,577,860 B2 * 8/2009 Carpenter ............ G06F 1/3203
713/300
(Continued)

FOREIGN PATENT DOCUMENTS

CN       101826684 A      9/2010

OTHER PUBLICATIONS

Wright et al., Vision: The case for context-aware selective resume, Jun. 2011, 5 pages.*
(Continued)

*Primary Examiner* — Thuy Dao
(74) *Attorney, Agent, or Firm* — Muncy, Geissler, Olds & Lowe, P.C.

(57) ABSTRACT

A status controller, a computer system, and a status detecting method thereof are disclosed. The status controller is used in the computer system. A main controller is used for indicating a shutdown status or an active status by a first level of an active-shutdown indicating interface pin. The status controller includes a hardware basic input output controller and an embedded controller. The hardware basic input output controller is used for indicating whether the computer system is in a sleep status by a second level of a system controlling interface pin, wherein when the computer system is in the sleep status, the hardware basic input output controller changes the second level. The embedded controller determines whether the computer system is in the shutdown or the active status by the first level and in the sleep status by the second level.

16 Claims, 3 Drawing Sheets

(58) Field of Classification Search
CPC ........... G06K 7/10732; G06K 7/10752; G06K 7/10821; G06K 7/109; G05B 15/02; A61B 5/024
See application file for complete search history.

(56) References Cited

U.S. PATENT DOCUMENTS

| | | | | |
|---|---|---|---|---|
| 7,882,162 | B2* | 2/2011 | Hunt | G06F 1/3203 |
| | | | | 707/782 |
| 9,213,399 | B2* | 12/2015 | So | G06F 1/325 |
| 9,403,000 | B2* | 8/2016 | Lyons | A61B 5/7275 |
| 2005/0283055 | A1* | 12/2005 | Shirai | A61B 5/16 |
| | | | | 600/301 |
| 2006/0101292 | A1* | 5/2006 | Hahn | G06F 9/4418 |
| | | | | 713/300 |
| 2010/0088547 | A1* | 4/2010 | Chang | G06F 11/2284 |
| | | | | 714/36 |
| 2016/0217672 | A1* | 7/2016 | Yoon | A61B 5/024 |

OTHER PUBLICATIONS

Xi et al., Understanding the critical path in power state transition latencies, Sep. 2013, 6 pages.*

Rogers et al., The core-C6 (CC6) sleep state of the AMD bobcat x86 microprocessor, Jul. 2012, 6 pages.*

* cited by examiner

STATUS CONTROLLER, COMPUTER SYSTEM, AND STATUS DETECTING METHOD THEREOF

BACKGROUND OF THE INVENTION

1. Field of the Invention

The exemplary embodiment(s) of the present invention is related to a status controller, a computer system, and a status detecting method thereof. More specifically, the exemplary embodiment(s) of the present invention is related to a status controller, a computer system, and a status detecting method thereof which could determine whether the computer system enters the status.

2. Description of the Related Art

With the improvement of the technology, computer systems have become common apparatuses in the daily life. In order to lower the power consumption, computer systems have not only normal active status and shutdown status, but also sleep status. In the sleep status, computer systems would stop operating part of the modules and only keep the necessary modules, and return to the normal active status when being triggered by an external signal. Thus, the energy-saving effect could be achieved.

In the prior arts, a main controller is usually used to inform the embedded controller in the computer system. Two physical circuit pins disposed between the main controller and the embedded controller are used by the embedded controller to check whether the computer system is in active status, shutdown status or sleep status, for example the common V5S_EN pin and the PMIC_PWGD pin are used. The embedded controller uses the PMIC_PWGD pin to check whether the computer system is in the active status or in the shutdown status, and uses the V5S_EN pin to check whether the computer system is in the sleep status. However, by this way the circuit layout inside the computer system has to reserve rooms for these two physical circuit pins, and it causes the manufacturing cost rising and it is also difficult for designing the computer systems nowadays because the designs are required to be thin and light. Besides, the V5S_EN pin has a misjudgment time, and it is possible that the level is changed before the computer system entering the sleep status, and thus the embedded controller would make a misjudgment.

On the other hand, in the prior arts, if the V5S_EN pin was used to determine whether the computer system enters the sleep status, it indicates that the whole hardware modules inside the computer system enter the sleep status. However, INTEL® has proposed a new specification, i.e. S0-i3 status, and when the computer system is in the S0-i3 status, part of the hardware inside the computer system could still be operated normally, such as Bluetooth module, GPS module, audio module, network module, or touch control module. Therefore, the computer system could be flexibly set whether enters the sleep status or not. However, in the prior arts, the hardware V5S_EN pin could not determine precisely whether each module inside the computer system enters the sleep status.

Thus, a status controller, a computer system, and a status detecting method thereof are needed to solve the disadvantages of the prior arts.

SUMMARY OF THE INVENTION

The main object of the present invention is to provide a status controller, which has a function to check whether the computer system enters the sleep status.

Another object of the present invention is to provide a computer system having the aforementioned status controller.

Still another object of the present invention is to provide a status detecting method used in the aforementioned computer system.

In order to achieve the above object, the status controller of the present invention is used in a computer system. The computer system has a main controller, and the main controller is connected with an active-shutdown indicating interface pin and used for indicating a shutdown status or an active status through a level status of a first level of the active-shutdown indicating interface pin. The status controller comprises a hardware basic input output controller and an embedded controller. The hardware basic input output controller is connected with a system controlling interface pin and used for indicating whether the computer system is in a sleep status through the level status of a second level of the system controlling interface pin, wherein when the computer system is in the sleep status, the hardware basic input output controller controls the system controlling interface pin to change the level status of the second level. The embedded controller is electrically connected with the hardware basic input output controller via the system controlling interface pin and electrically connected with the main controller via the active-shutdown indicating interface pin, and the embedded controller determines whether the computer system is in the shutdown status or in the active status by detecting the level status of the first level of the active-shutdown indicating interface pin, and determines whether the computer system is in the sleep status by detecting the level status of the second level of the system controlling interface pin.

The computer system of the present invention comprises a main controller and a status controller. The main controller is connected with an active-shutdown indicating interface pin and used for indicating a shutdown status or an active status through a level status of a first level of the active-shutdown indicating interface pin. The status controller is electrically connected with the main controller. The status controller comprises a hardware basic input output controller and an embedded controller. The hardware basic input output controller is connected with a system controlling interface pin and used for indicating whether the computer system is in a sleep status through the level status of a second level of the system controlling interface pin, wherein when the computer system is in the sleep status, the hardware basic input output controller controls the system controlling interface pin to change the level status of the second level. The embedded controller is electrically connected with the hardware basic input output controller via the system controlling interface pin and electrically connected with the main controller via the active-shutdown indicating interface pin, and the embedded controller determines whether the computer system is in the shutdown status or in the active status by detecting the level status of the first level of the active-shutdown indicating interface pin, and determines whether the computer system is in the sleep status by detecting the level status of the second level of the system controlling interface pin.

The status detecting method comprises the following steps: detecting whether a level status of a first level of the active-shutdown indicating interface pin is a high level; if yes, determining the computer system is in an active status; making the level status of a second level of the system controlling interface pin be a low level when the computer system is in a sleep status; determining the computer system is in the sleep status according to the low level status of the second of the system controlling interface pin; changing the level status of the second level of the system controlling interface pin from the low level to the high level when the computer system returns to the active status from the sleep status, and determining the computer system is in the active status according to the high level status of the second of the system controlling interface pin.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

The aforementioned and other objectives, features, and advantages of the present invention will become more apparent from the following detailed description when taken in conjunction with the accompanying drawings.

Figure 1:
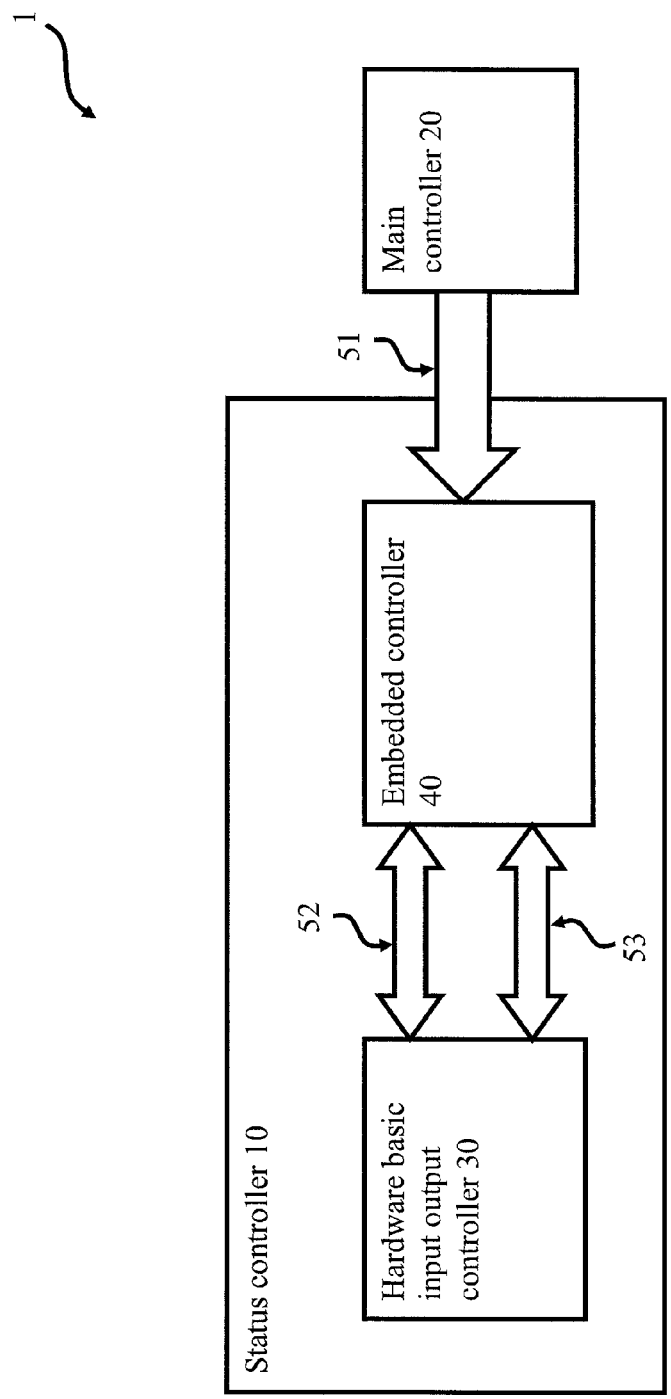
FIG. 1 is a structure schematic diagram of the sleep status controller in accordance with the present invention.

Please first refer to FIG. 1, which is a structure schematic diagram of the status controller in accordance with the present invention.

The computer system 1 of the present invention could be systems such as a normal desktop computer, a laptop, or a tablet, but the present invention does not limit it. The operation statuses of the computer system 1 could include a normal active status, a shutdown status, and a sleep status. The normal active status (i.e. S0 status) indicates a status that the computer system 1 receives power, and all modules inside the computer system 1 operate normally. The shutdown status (i.e. S5 status) indicates a status that the computer system 1 could not receive power, and the modules inside the computer system 1 do not operate. In order to lower the power consumption of the computer system 1, the computer system 1 may enter the sleep status (i.e. S0-i3 status) when it is in the normal action status and is not operated during a specific time. When in the sleep status, the computer system 1 would only keep necessary module for operation, such as the network module or the audio module, and stop operating other modules for saving power. Therefore, when the computer system 1 is waked up, the computer system 1 could return to the original normal action status quickly.

The computer system 1 comprises a status controller 10 and a main controller 20. The status controller 10 is used to control the computer system 1 and check whether the computer system 1 enters the sleep status, so as to further control other modules in the computer system 1 to execute corresponding operation. The status controller 10 is electrically connected with the main controller 20. The status controller 10 comprises a hardware basic input output controller 30 and an embedded controller 40. The main controller 20, the hardware basic input output controller 30, and the embedded controller 40 could be constructed by hardware, hardware collocated with software, or hardware collocated with firmware, the present invention does not limit it. The main controller 20 could be a mother board, and an active-shutdown indicating interface pin 51 disposed between the main controller 20 and the embedded controller 40 could be used for electrically connecting the main controller 20 and the embedded controller 40. The active-shutdown indicating interface pin 51 could be a PMIC_P-WGD pin. The level status of a first level of the active-shutdown indicating interface pin 51 is used for indicating whether the computer system 1 is in the normal active status or in the shutdown status. In one embodiment of the present invention, the computer system 1 is in the normal active status if the level status of the first level of the active-shutdown indicating interface pin 51 is at high level; the computer system 1 is in the shutdown status if the level status of the first level of the active-shutdown indicating interface pin 51 is at low level. By this way, the main controller 20 could control the active-shutdown indicating interface pin 51 to be high level or low level according to the normal active status or shutdown status of the computer system 1.

The hardware basic input output controller 30 is a hardware basic chip controlling device inside the computer system 1. The embedded controller 40 is electrically connected with the hardware basic input output controller 30 via a system controlling interface pin 52. The system controlling interface pin 52 could be SMI (System Management Interrupt) pin or SCI (System Control Interrupt) pin, but the present invention does not limit it. The level status of a second level of the system controlling interface pin 52 is used for indicating whether the computer system 1 is in the sleep status. In one embodiment of the present invention, the computer system 1 is in the sleep status if the level status of the second level of the system controlling interface pin 52 is at low level; the computer system 1 is not in the sleep status if the level status of the second level of the system controlling interface pin 52 is at high level. Therefore, the hardware basic input output controller 30 would control the level status of the second level of the system controlling interface pin 52 to be at low level when the computer system 1 enters the sleep status. The way of the hardware basic input output controller 30 controlling the system controlling interface pin 52 could be realized by the user operating, such as the user pressing a sleep control button (not shown in the figure) and making the computer system 1 enter the sleep status. At this time, the hardware basic input output controller 30 would control the level status of the second level of the system controlling interface pin 52 to be at low level. Besides, if the computer system 1 is not operated in a specific time, the hardware basic input output controller 30 could also control the computer system 1 to enter the sleep status, and control the level status of a second level of the system controlling interface pin 52 to be at low level at the same time. There are still other signal transmitting interfaces 53 disposed between the hardware basic input output controller 30 and the embedded controller 40, such as LPC (Low Pin Count Bus) or I2C (Internal IC Bus), which are used for data transmitting between the hardware basic input output controller 30 and the embedded controller 40. Due to using the signal transmitting interfaces 53 to transmit data is not the point of the present invention, it will not be described here.

The embedded controller 40 could be a keyboard controlling chip, but the present invention does not limit it. The embedded controller 40 is electrically connected with the main controller 20 and the hardware basic input output controller 30 at the same time. The embedded controller 40 could determine whether the computer system 1 is in the normal active status or in the shutdown status according to the level status of the first level of the active-shutdown indicating interface pin 51, and determine whether the computer system 1 is in the sleep status according to the level status of the second level of the system controlling interface pin 52. Therefore, the embedded controller 40 could execute some operations correspondingly. In addition, the system controlling interface pin 52 is a dual-direction signal transmission interface, and thus if the computer system 1 is in the normal active status and the embedded controller 40 detects the trigger event, such as switching different kinds of power input to the computer system 1 or controlling the computer system 1 to execute a frequency up/down conversion, the embedded controller 40 would control the level status of the second level of the system controlling interface pin 52 to be changed to the high level or the low level, so as to inform the hardware basic input output controller 30 to execute the corresponding operations. Thus, in one embodiment of the present invention, before the embedded controller 40 triggering the trigger event, the embedded controller 40 would firstly confirm the level status of the second level of the system controlling interface pin 52. If the level status of the second level of the system controlling interface pin 52 is high level, it indicates that the computer system 1 is in the active status. Next, the embedded controller 40 would set the system controlling interface pin 52 as an output end, and inform the hardware basic input output controller 30 by providing a break signal, for example providing a low level pulse wave to inform the hardware basic input output controller 30. After that, the hardware basic input output controller 30 would further communicate with the embedded controller 40 via the signal transmitting interfaces 53.

Figure 2A:
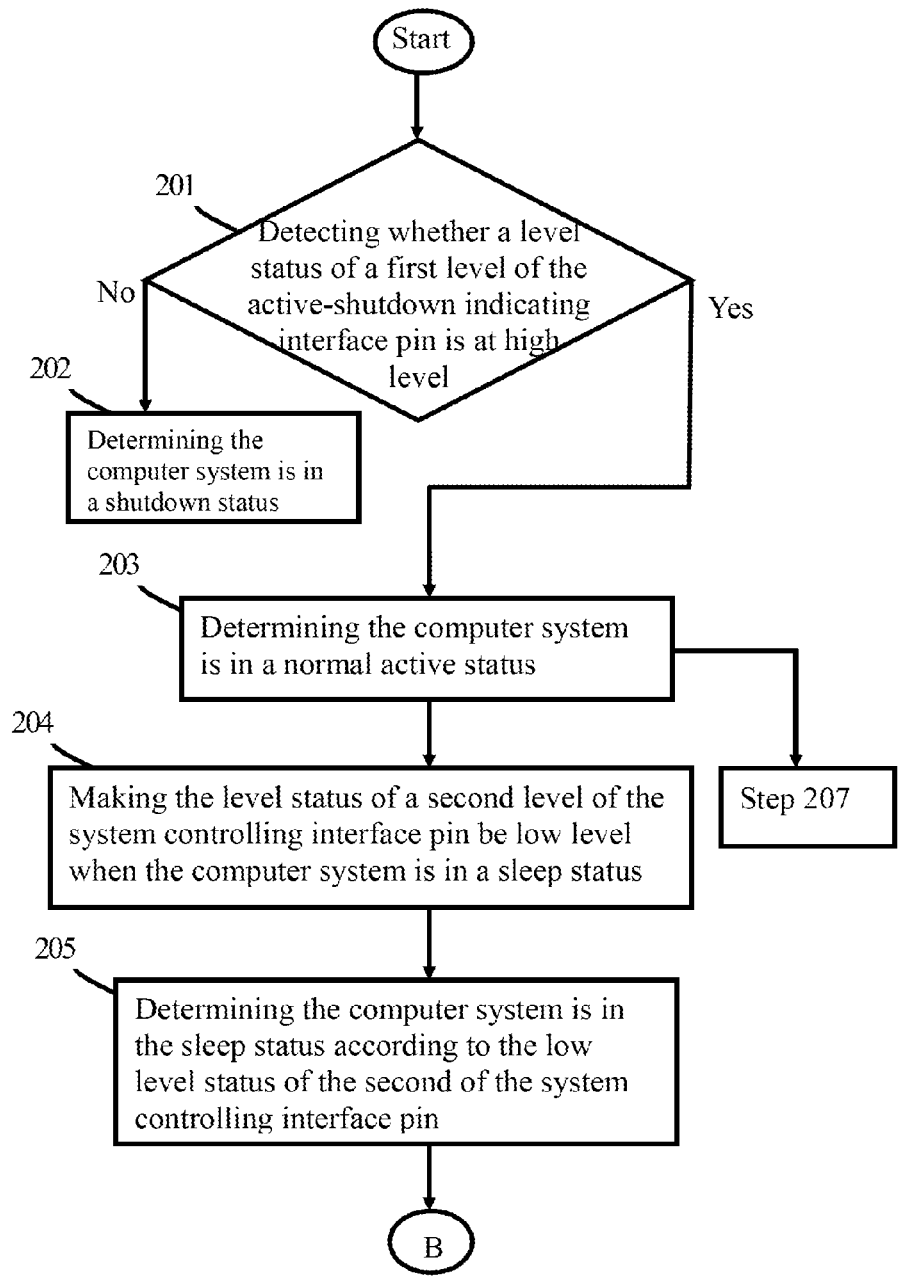
FIGS. 2A-2B are flow charts of the status detecting method in accordance with the present invention.
Figure 2B:
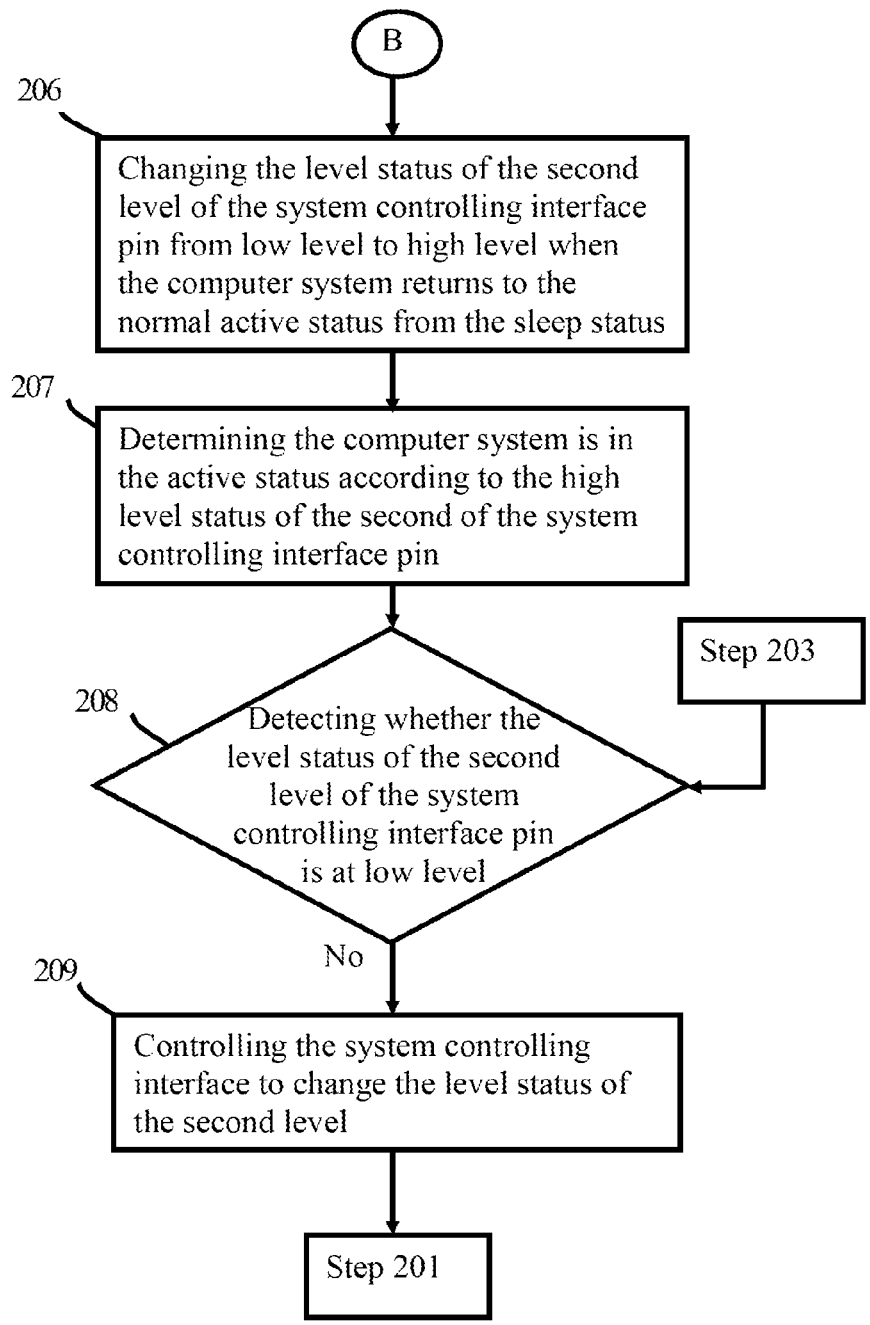

Following please refer to FIG. 2, which is a flow chart of the status detecting method in accordance with the present invention. It is noted here that though the computer system 1 having the status controller 10 is taken as an example to explain the status detecting method of the present invention, but the status detecting method of the present invention is not limited to be used on the status controller 10.

First perform the step 201: detecting whether a level status of a first level of the active-shutdown indicating interface pin is at high level.

First, the embedded controller 40 checks whether the computer system 1 is in the normal active status or in the shutdown status by detecting the level status of the first level of the active-shutdown indicating interface pin 51.

If the embedded controller 40 detects that the level status of the first level of the active-shutdown indicating interface pin 51 is at low level, preform the step 202: determining the computer system is in a shutdown status.

When the computer system 1 is in the shutdown status, the main controller 20 would set the level status of the first level of the active-shutdown indicating interface pin 51 as low level. Therefore, the embedded controller 40 determines the computer system 1 is in a shutdown status according to the low level status of the first level of the active-shutdown indicating interface pin 51.

If the embedded controller 40 detects that the level status of the first level of the active-shutdown indicating interface pin 51 is at high level, preform the step 203: determining the computer system is in a normal active status.

When the user presses the power button to turn on the computer system 1, or the computer system 1 executes the start-up procedures due to receiving power, the main controller 20 would set the level status of the first level of the active-shutdown indicating interface pin 51 as high level. Therefore, the embedded controller 40 determines the computer system 1 is in the normal active status according to the high level status of the first level of the active-shutdown indicating interface pin 51.

Next, perform the step 204: making the level status of a second level of the system controlling interface pin be at low level when the computer system is in a sleep status.

Next the computer system 1 enters the sleep status. The computer system 1 could be controlled by the hardware basic input output controller 30 to enter the sleep status when the computer system 1 is not operated during a specific time, or could be controlled by the user. At this time, the hardware basic input output controller 30 controls the system controlling interface pin 52 to change the level status of the second level to low level, and the hardware basic input output controller 30 set the system controlling interface pin 52 as the output end so as to output to the embedded controller 40. When the computer system 1 is in the sleep status, the hardware basic input output controller 30 would keep the level status of the second level of the system controlling interface pin 52 at low level.

Next perform the step 205: determining the computer system is in the sleep status according to the low level status of the second of the system controlling interface pin.

Following the embedded controller 40 detects and checks whether the level status of the second level of the system controlling interface pin 52 is at high level or at low level. Because the hardware basic input output controller 30 has already set the system controlling interface pin 52 as the output end, and on the side of the embedded controller 40, the system controlling interface pin 52 is an input end. Thus, the signal of low level status of the second level of the system controlling interface pin 52 could be received by the embedded controller 40, and the embedded controller 40 could be informed that the computer system enters the sleep status.

Next, perform the step 206: changing the level status of the second level of the system controlling interface pin from low level to high level when the computer system returns to the normal active status from the sleep status.

Following if the computer system 1 returns to the normal active status, the hardware basic input output controller 30 would control the level status of the second level of the system controlling interface pin 52 back to high level.

Following perform the step 207: determining the computer system is in the normal active status according to the high level status of the second of the system controlling interface pin.

When detecting the level status of the second level of the system controlling interface pin 52 is at high level, the embedded controller 40 would determine the computer system 1 re-enters the normal active status.

Besides, when the computer system 1 is in the normal active status in the step 203 or step 207, the step 208 could be further performed: detecting whether the level status of the second level of the system controlling interface pin is at low level.

If the computer system 1 is in the normal active status and the embedded controller 40 detects the trigger event, such as switching different kinds of power input to the computer system 1 or controlling the computer system to execute a frequency up/down conversion, the embedded controller 40 would firstly determine whether the level status of the second level of the system controlling interface pin 52 is at low level. If the level status of the second level of the system controlling interface pin 52 is at low level, it indicates that the computer system 1 is in the sleep status and thus the embedded controller 40 would not operate.

If the level status of the second level of the system controlling interface pin 52 is the high level, then perform step 209: controlling the system controlling interface pin to change the level status of the second level.

If the level status of the second level of the system controlling interface pin 52 is at high level, the embedded controller 40 would determine the computer system 1 is in the normal active status, thus the embedded controller 40 would set the system controlling interface pin 52 as the output end and provide an interrupt signal to the hardware basic input output controller 30, for example provides a low level pulse wave to inform the hardware basic input output controller 30. After that, the hardware basic input output controller 30 and the embedded controller 40 could communicate with each other via the signal transmitting interface pin 53, and thus the hardware basic input output controller 30 could execute the corresponding operation according to the trigger event.

At the end, the status controller 10 would return to the step 201, and thus re-execute the procedures of the sleep status detecting.

It has to be noted here that the status detecting method of the present invention is not limited by the sequence of the aforementioned steps, in order to achieve the object of the present invention, the sequence of the aforementioned steps could be changed.

By the status controller 10 the status detecting method of the present invention, the status of the computer system 1 could be obtained under limited hardware structure and without complicated circuit design.

As described above, the objectives, means, and effectiveness of the present invention are different from the characteristics of the prior art. It would be appreciated if the patent application could be issued as early as possible to benefit society. It should be also noted that the embodiments described above are for illustrative purposes; the disclosed claims of the present invention should be within the range of the accompanying claims and should not be limited to the embodiments described above.

What is claimed is:

1. A status controller, adopted in a computer system, the computer system having a main controller, wherein the main controller is connected with an active-shutdown indicating interface pin and used for indicating a shutdown status or an active status through a level status of a first level of the active-shutdown indicating interface pin, the status controller comprising:
    a hardware basic input output controller, connected with a system controlling interface pin and used for indicating whether the computer system is in a sleep status through the level status of a second level of the system controlling interface pin, wherein when the computer system is in the sleep status, the hardware basic input output controller controls the system controlling interface pin to change the second level; and
    an embedded controller, electrically connected with the hardware basic input output controller via the system controlling interface pin and electrically connected with the main controller via the active-shutdown indicating interface pin for determining whether the computer system is in the shutdown status or in the active status by detecting the level status of the first level of the active-shutdown indicating interface pin, and determining whether the computer system is in the sleep status by detecting the level status of the second level of the system controlling interface pin; wherein the embedded controller determines that the computer system is in the sleep status when the second level of the system controlling interface pin is at low level and the hardware basic input output controller changes the second level of the system controlling interface pin to low level when the computer system does not operate in a specific time.

2. The status controller as claimed in claim 1, wherein the system controlling interface pin is a dual-direction signal transmission interface.

3. The status controller as claimed in claim 2, wherein if the embedded controller detects a trigger event when the computer system is in the active status, the embedded controller controls the system controlling interface pin to change the second level to high level or low level.

4. The status controller as claimed in claim 3, wherein the trigger event comprises switching different kinds of power input to the computer system, or controlling the computer system to execute a frequency up/down conversion.

5. The status controller as claimed in claim 1, wherein the embedded controller determines that the computer system is in the active status when the first level of the active-shutdown indicating interface pin is at high level, and determines that the computer system is in the shutdown status when the first level of the active-shutdown indicating interface pin is at low level.

6. The status controller as claimed in claim 1, wherein the embedded controller determines that the computer system is changed from the sleep status to the active status when the first level of the active-shutdown indicating interface pin is at high level and the second level of the system controlling interface pin is changed from low level to high level.

7. A status detecting method, adopted in a computer system, the computer system including a main controller, a hardware basic input output controller and an embedded controller, the embedded controller being electrically connected with the hardware basic input output controller via a system controlling interface pin and being electrically connected with the main controller via an active-shutdown indicating interface pin, the method comprising the following steps:
    detecting whether a level status of a first level of the active-shutdown indicating interface pin is at high level;
    if yes, determining the computer system is in an active status;
    making the level status of a second level of the system controlling interface pin be at low level when the computer system is in a sleep status;
    changing the second level of the system controlling interface pin to low level when the computer system does not operate in a specific time;
    determining that the computer system is in the sleep status according to the low level status of the second of the system controlling interface pin;
    changing the level status of the second level of the system controlling interface pin from low level to high level when the computer system returns to the active status from the sleep status; and
    determining that the computer system is in the active status according to the high level status of the second of the system controlling interface pin.

8. The status detecting method as claimed in claim 7, further comprising the following steps:
    determining the computer system is in a shutdown status if the level status of the first level of the active-shutdown indicating interface pin is in at low status.

9. The status detecting method as claimed in claim 8, further comprising the following steps:
determining the computer system is changed from the sleep status to the active status when the level status of the first level of the active-shutdown indicating interface pin is at high level and the level status of the second level of the system controlling interface pin is changed from low level to high level.

10. The status detecting method as claimed in claim 7, further comprising the following steps:
detecting whether the level status of the second level of the system controlling interface pin is at low level when the computer system is in the active status and a trigger event is detected; and
if no, changing the level of the level status of the system controlling interface pin.

11. A computer system, comprising:
a main controller, connected with an active-shutdown indicating interface pin and used for indicating a shutdown status or an active status through a level status of a first level of the active-shutdown indicating interface pin; and
a status controller, electrically connected with the main controller, the status controller comprising:
a hardware basic input output controller, connected with a system controlling interface pin and used for indicating whether the computer system is in a status through the level status of a second level of the system controlling interface pin, wherein when the computer system is in the sleep status, the hardware basic input output controller controls the system controlling interface pin to change the second level; and
an embedded controller, electrically connected with the hardware basic input output controller via the system controlling interface pin and electrically connected with the main controller via the active-shutdown indicating interface pin for determining whether the computer system is in the shutdown status or in the active status by detecting the level status of the first level of the active-shutdown indicating interface pin, and determining whether the computer system is in the sleep status by detecting the level status of the second level of the system controlling interface pin; wherein the embedded controller determines that the computer system is in the sleep status when the second level of the system controlling interface pin is at low level and the hardware basic input output controller changes the second level of the system controlling interface pin to low level when the computer system does not operate in a specific time.

12. The computer system as claimed in claim 11, wherein the system controlling interface pin is a dual-direction signal transmission interface.

13. The computer system as claimed in claim 12, wherein if the embedded controller detects a trigger event when the computer system is in the active status, the embedded controller controls the system controlling interface pin to change the second level to high level or low level.

14. The computer system as claimed in claim 13, wherein the trigger event comprises switching different kinds of power input to the computer system, or controlling the computer system to execute a frequency up/down conversion.

15. The computer system as claimed in claim 11, the embedded controller determines that the computer system is in the active status when the first level of the active-shutdown indicating interface pin is at high level, and determines that the computer system is in the shutdown status when the first level of the active-shutdown indicating interface pin is at low level.

16. The computer system as claimed in claim 11, wherein the embedded controller determines that the computer system is changed from the sleep status to the active status when the first level of the active-shutdown indicating interface pin is at high level and the second level of the system controlling interface pin is changed from low level to high level.

* * * * *